(12) United States Patent
Gawad

(10) Patent No.: US 10,541,876 B2
(45) Date of Patent: Jan. 21, 2020

(54) INTER-CONNECTING LOGICAL CONTROL PLANES FOR STATE DATA EXCHANGE

(71) Applicant: Nicira, Inc., Palo Alto, CA (US)

(72) Inventor: Ahmed Abdel Gawad, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 342 days.

(21) Appl. No.: 15/431,991

(22) Filed: Feb. 14, 2017

(65) Prior Publication Data

US 2018/0234299 A1    Aug. 16, 2018

(51) Int. Cl.
*H04L 12/24* (2006.01)
*H04L 12/26* (2006.01)
*H04L 29/08* (2006.01)

(52) U.S. Cl.
CPC .................... *H04L 41/12* (2013.01)

(58) Field of Classification Search
CPC .......... H04L 41/12; H04L 43/16; H04L 67/10
See application file for complete search history.

(56) References Cited

U.S. PATENT DOCUMENTS

| 7,200,144 | B2 * | 4/2007 | Terrell | H04L 45/00 370/389 |
| 7,286,490 | B2 * | 10/2007 | Saleh | H04L 12/66 370/217 |
| 7,804,769 | B1 * | 9/2010 | Tuplur | H04L 45/00 370/218 |
| 7,929,424 | B2 * | 4/2011 | Kochhar | H04J 3/0685 370/220 |
| 8,111,619 | B2 * | 2/2012 | Liu | H04L 45/24 370/229 |
| 9,198,203 | B2 * | 11/2015 | Shaffer | H04L 45/24 |
| 9,306,837 | B1 * | 4/2016 | Jain | H04L 45/16 |
| 2005/0283530 | A1 * | 12/2005 | O'Neal | H04L 12/1854 709/224 |
| 2006/0259607 | A1 * | 11/2006 | O'Neal | H04L 12/1836 709/223 |
| 2007/0008884 | A1 * | 1/2007 | Tang | H04L 29/06 370/230 |
| 2007/0156919 | A1 * | 7/2007 | Potti | G06F 8/656 709/238 |
| 2008/0063003 | A1 * | 3/2008 | O'Neal | H04L 12/1854 370/408 |
| 2008/0133687 | A1 * | 6/2008 | Fok | G06F 9/5027 709/207 |

(Continued)

*Primary Examiner* — Kostas J Katsikis
(74) *Attorney, Agent, or Firm* — Patterson + Sheridan, LLP

(57) ABSTRACT

Certain embodiments described herein are generally directed to interconnecting a plurality of local control planes (LCP) for state data exchange. In some embodiments, a first LCP receives the state data and a distribution list from a central control plane (CCP) node. The distribution list may comprise identifiers of LCPs to which the state data relates. In certain embodiments, the first LCP transmits an acknowledgment to the CCP node indicating receipt of the state data. In some embodiments, the first LCP identifies, according to a distribution pattern, one or more target LCPs of those identified in the distribution list. The distribution pattern may be based on information in the distribution list, information stored by the first LCP, or a combination of the two. In some embodiments, the first LCP may transmit the state data to the one or more target LCPs.

18 Claims, 5 Drawing Sheets

(56) References Cited

U.S. PATENT DOCUMENTS

| | | | |
|---|---|---|---|
| 2009/0279549 A1* | 11/2009 | Ramanathan | G06F 8/65 |
| | | | 370/395.4 |
| 2010/0061231 A1* | 3/2010 | Harmatos | H04L 45/02 |
| | | | 370/228 |
| 2010/0162036 A1* | 6/2010 | Linden | G06F 11/181 |
| | | | 714/4.11 |
| 2010/0165877 A1* | 7/2010 | Shukla | H04L 41/0843 |
| | | | 370/254 |
| 2011/0173490 A1* | 7/2011 | Narayanaswamy | |
| | | | H04L 63/1408 |
| | | | 714/4.11 |
| 2011/0317559 A1* | 12/2011 | Kern | H04L 45/02 |
| | | | 370/235 |
| 2013/0266315 A1* | 10/2013 | Drury | H04L 14/0254 |
| | | | 14/254 |
| 2013/0297802 A1* | 11/2013 | Laribi | H04L 12/6418 |
| | | | 709/226 |
| 2015/0052262 A1* | 2/2015 | Chanda | H04L 61/2015 |
| | | | 709/245 |
| 2015/0271073 A1* | 9/2015 | Saladi | H04L 47/37 |
| | | | 370/230 |
| 2016/0014028 A1* | 1/2016 | He | H04L 45/745 |
| | | | 370/392 |
| 2017/0063633 A1* | 3/2017 | Goliya | H04L 41/12 |
| 2017/0318113 A1* | 11/2017 | Ganichev | H04L 43/16 |
| 2017/0331746 A1* | 11/2017 | Qiang | H04L 45/16 |
| 2018/0123877 A1* | 5/2018 | Saxena | H04L 41/12 |
| 2018/0152321 A1* | 5/2018 | Sevinc | H04L 12/4641 |
| 2018/0219726 A1* | 8/2018 | Wang | H04L 41/082 |
| 2018/0367442 A1* | 12/2018 | Goliya | H04L 45/02 |

* cited by examiner

INTER-CONNECTING LOGICAL CONTROL PLANES FOR STATE DATA EXCHANGE

BACKGROUND

Software defined networking (SDN) comprises a plurality of hosts in communication over a physical network infrastructure, each host having one or more virtualized endpoints such as VMs or containers that are connected to one another over logical overlay networks that are decoupled from the underlying physical network infrastructure. One common characteristic of software defined networking is a separation of the control plane from the data plane. Control planes in a network are concerned with determining the logical overlay network topology and maintaining information about network entities such as logical switches, logical routers, and virtualized endpoints, etc. The logical topology information is translated by the control plane into state data, such as forwarding table entries to populate forwarding tables at the virtual switches at each host. In large data centers having hundreds or thousands of hosts and/or logical networks, the processing and communication requirements are such that a single computer system is incapable of performing all the necessary tasks for all the hosts and networks. To address this problem various techniques for scaling out the control plane have been implemented. For example, to distribute some of the processing load to the hosts, the control plane may be divided into a central control plane (CCP) as well as local control planes (LCP) at each host. The CCP may be implemented as a cluster of CCP nodes in order to further distribute the processing load. Typically, the CCP nodes directly transmit state data to the LCP on every host individually in order to ensure that all hosts maintain a unified picture of the system.

While it is generally effective for CCP nodes to transmit the state data to the LCP on each host directly, this process can become inefficient when the number of hosts scales (e.g., to thousands of hosts). Two-way communication between a relatively small number of CCP nodes and a vast number of LCPs can prove to be a source of latency, and can impose a significant burden on the communication resources of the CCP nodes. Consequently, the requirement of directly transmitting state data to each LCP directly can impose a practical limit on the number of hosts that the CCP is capable of supporting. Therefore, there exists a need for a more efficient method of distributing state data to a plurality of LCPs so that a CCP can support a larger number of hosts.

SUMMARY

Herein described are one or more embodiments of a method for inter-connecting a plurality of local control planes (LCP) for state data exchange. The method includes receiving, by a first LCP and from a central control plane (CCP) node, the state data and a distribution list, wherein the distribution list comprises identifiers of LCPs to which the state data relates. The method further includes, transmitting, by the first LCP, an acknowledgment to the CCP node indicating that the LCP has received the state data. The method further includes identifying, by the first LCP, and according to a distribution pattern, one or more target LCPs of the LCPs identified in the distribution list, wherein the distribution pattern is based on at least one of: information included in the distribution list; and information stored by the first LCP. The method further includes transmitting, by the first LCP, the state data to the one or more target LCPs.

Also described herein are embodiments of a non-transitory computer readable medium comprising instructions to be executed in a computer system, wherein the instructions when executed in the computer system perform the method described above for inter-connecting a plurality of LCPs for state data exchange.

Also described herein are embodiments of a computer system, wherein software for the computer system is programmed to execute the method described above for inter-connecting a plurality of LCPs for state data exchange.

DETAILED DESCRIPTION

Embodiments presented herein relate to inter-connecting a plurality of local control planes (LCPs) for state data exchange. For example, in some embodiments, a plurality of central control plane (CCP) nodes may need to distribute state data to a plurality of LCPs to which the state data relates. Each CCP node may identify a subset of the plurality of LCPs to which the state data relates, and transmit the state data to this subset along with a distribution list. The distribution list may, for example, comprise a list of identifiers of the LCPs to which the state data relates. One or more LCP of the subset may then receive the state data and the distribution list, and transmit the state data to one or more LCPs on the distribution list according to a distribution pattern. The distribution pattern may, for example, be described in the distribution list, or it may be determined in advance by the CCP nodes and stored by each LCP. Alternatively, the distribution pattern may be based on a combination of information included in the distribution list and information stored by the LCP. The distribution pattern determines the manner in which the distribution of state data is broken up among the various LCPs.

Each LCP, upon receiving the state data, may transmit an acknowledgment back to the CCP node from which the state data originated. The acknowledgments may allow each CCP node to ensure that the state data was received by all LCPs on the distribution list. If a CCP node does not receive an acknowledgment from certain LCPs, the CCP node may then transmit the state data to those certain LCPs directly. Alternatively, if the number of particular LCPs which did not send an acknowledgment is sufficiently large, the CCP node may identify a new subset of these particular LCPs and begin a new distribution pattern by sending the state data and a new distribution list to this subset. Once the CCP node has received acknowledgments from all LCPs on the distribution list, the CCP knows that the state data has been completely distributed.

The network may, for example, be implemented as a logical network or a physical network, and nodes and control planes may be implemented as software or hardware entities.

Figure 1:
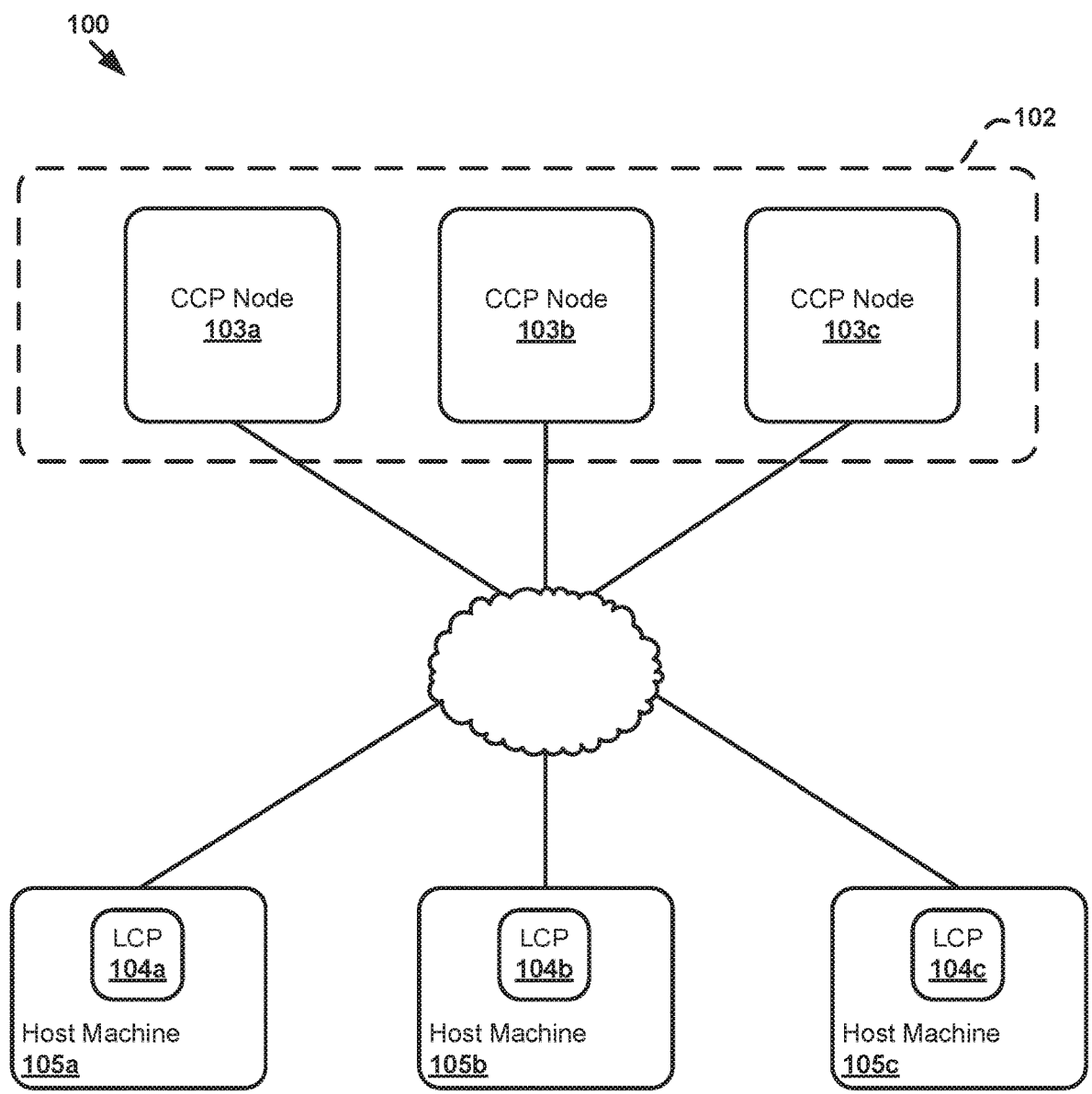
FIG. 1 is a block diagram illustrating an exemplary network in which one or more embodiments of a method for inter-connecting a plurality of local control planes (LCP) for state data exchange may be implemented.

FIG. 1 is a block diagram of a network 100 in which one or more embodiments described herein may be implemented. It should be understood that network 100 may include additional and/or alternative components than that shown, depending on the desired implementation. Network 100 includes a central control plane (CCP) cluster 102, which may be comprise a cluster of one or more physical or virtual servers. In the embodiment depicted, CCP cluster 102 is implemented as a plurality of CCP nodes 103. A CCP node (e.g., CCP node 103a) may refer generally to a physical or virtual server which receives and handles packets from other network entities. In practice, CCP cluster 102 may comprise a cluster of three CCP nodes 103a-103c as shown, or fewer or greater number of CCP nodes.

Network 100 further includes a plurality of host machines 105, each of which comprises a local control plane (LCP) 104. While three host machines 105a-105c are depicted, there could be fewer or more host machines 105 (e.g. thousands). A host machine 105 may, for example, comprise a hardware computing platform (e.g., a server computer, desktop computer, personal computer, tablet computer, mainframe, blade computer etc.) or a cluster of hardware computing platforms. Each hardware computing platform includes one or more central processing units (CPUs), system memory, storage, and one or more network interfaces for communicating with other hardware computing platforms within host machine 105 and/or network destinations outside of host machine 105. Each host machine 105 may execute a hypervisor. The hypervisor may include an LCP 104, which may, for example, comprise a software entity which performs control functions for a hypervisor. A hypervisor may, for example, comprise a software entity which executes one or more virtual machines. Though host machine 105 is described as supporting one or more virtual machines, host machine 105 may support or other virtual computing instances (e.g., containers (e.g., Docker containers), data compute nodes, isolated user space instances, etc.). A hypervisor may serve as an interface between hosted virtual machines and a physical network interface, as well as other physical resources available on host machine 105. Each LCP 104 may be connected to each CCP node 103 over network 100. Furthermore, LCPs 104 may be interconnected such that all LCPs 104 are able to communicate with each other. Host machines 105 may be connected by a physical network.

As discussed, the plurality of CCP nodes 103 may distribute state data to LCPs 104. For particular state data, one or more of CCP nodes 103 may generate a distribution list which includes identifiers of LCPs related to the state data. The distribution list may include, for example, identifiers of all LCPs 104 in the plurality of LCPs 104 if the state data concerns them all. In some embodiments, the distribution list may also include information describing a distribution pattern, such as an indication that the state data should be distributed according to a binary tree pattern. In other embodiments, the distribution pattern is determined in advance by CCP nodes 103 and stored by all CCP nodes 103 and LCPs 104. A hybrid of these two approaches may also be employed. Each CCP node 103 may identify a subset of the LCPs 104 in the distribution list, and transmit the state data along with the distribution list to this subset of LCPs 104 in order to begin the distribution pattern.

When an LCP 104 in the subset receives the state data and the distribution list, it may transmit an acknowledgment of receipt back to the CCP node 103 from which the state data originated. Then the LCP 104 may identify, based on the distribution pattern, one or more LCPs 104 of the LCPs 104 identified in the distribution list, and transmit the state data to these identified LCPs 104. The LCP 104 may also include the distribution list along with the state data it transmits to the identified LCPs 104, as the distribution pattern may need to be continued by the particular LCPs 104. When each of these identified LCPs 104 receives the state data, it may also transmit an acknowledgment of receipt back to the CCP node 103 from which the state data originated. The identified LCPs 104 may also transmit the state data, possibly including the distribution list, to another set of LCPs 104. This process continues until the distribution pattern is complete, with each LCP 104 providing an acknowledgment back to the CCP node 103. Accordingly, the CCP node 103 is able to determine whether there are any disruptions in the distribution, and can take corrective action if necessary. This is described in more detail with respect to FIG. 3 and FIG. 4 below.

Figure 2:
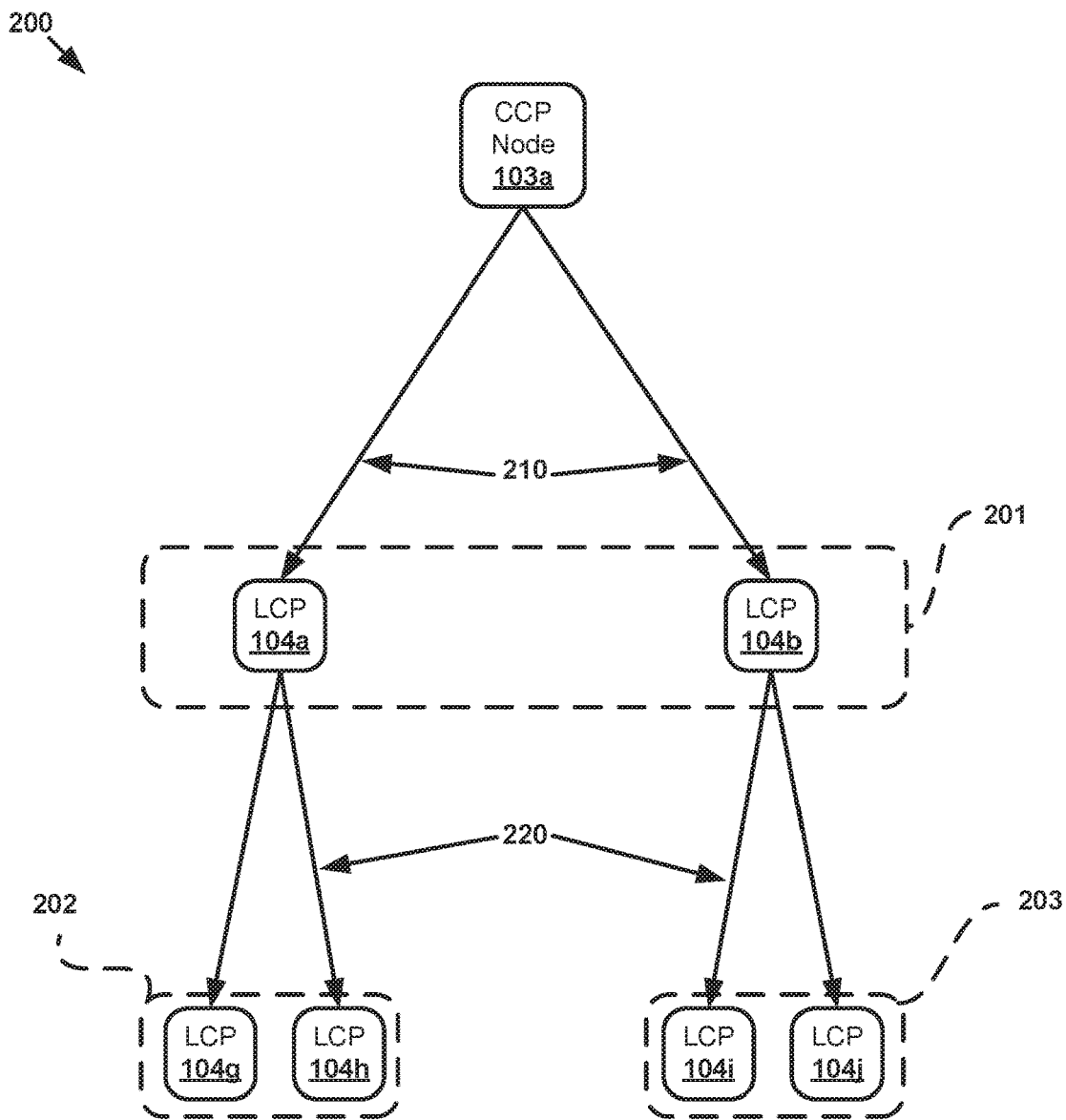
FIG. 2 illustrates a process for distributing state data to a plurality of LCPs using a particular distribution pattern in the network of FIG. 1.

FIG. 2 illustrates a process 200 for distributing state data to a plurality of LCPs 104 using a particular distribution pattern in the network of FIG. 1. Specifically, the process 200 involves a number of components described above with respect to FIG. 1.

At 210, CCP node 103a transmits state data and a distribution list to an LCP set 201, which comprises LCP 104a and LCP 104b. In some embodiments, CCP node 103a identifies LCP set 201 based on a distribution pattern such as a binary tree pattern as illustrated. The distribution pattern is discussed in more detail with respect to FIG. 5 below. The LCPs 104 in LCP set 201 receive the state data and distribution list, transmit acknowledgments to CCP Node 103a, and then use the distribution list and the distribution pattern (in the list, stored locally, or a combination of the two) to identify LCP sets 202 and 203.

At 220, LCP 104a transmits the state data to LCP set 202, comprising LCPs 104g and 104h, and LCP 104b transmits the state data to LCP set 203, comprising LCPs 104i and 104j. If the distribution pattern will not be finished with LCP sets 202 and 203, the distribution list may also be included with the state data. Otherwise, the distribution pattern may not be included with the state data. The LCPs 104 in LCP sets 202 and 203 receive the state data (and, in some embodiments, the distribution list), and transmit acknowledgments back to CCP node 103a. At this point, if the distribution pattern is complete, the LCPs 104 take no further action in this process. If the distribution pattern is not yet complete (for example, if there are additional LCPs 104 further down the binary tree which have not received the state data), the LCPs 104 in LCP sets 202 and 203 may use the distribution list and distribution pattern to identify additional sets of LCPs 104 to which to transmit the state data and, if the distribution pattern is to continue further still, the distribution list. The pattern continues until all LCPs 104 in the distribution list have received the state data.

Figure 3:
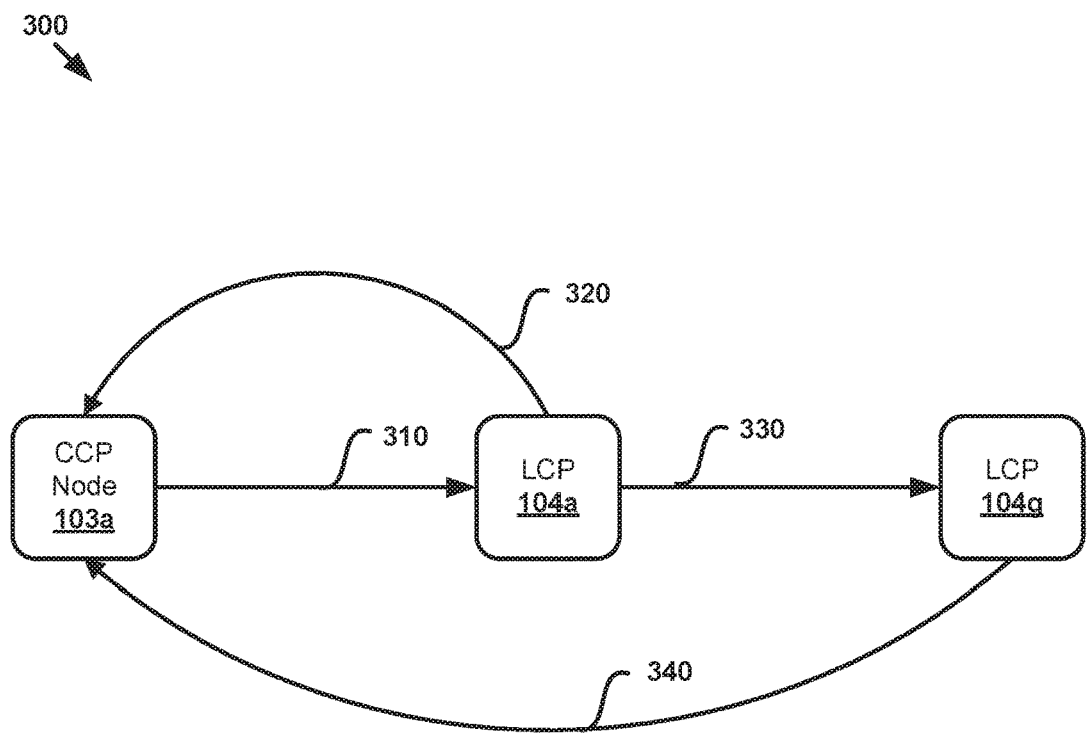
FIG. 3 is an illustration of a process by which LCPs provide an acknowledgment to a CCP node once they have received state data.

FIG. 3 is an illustration of a process 300 by which LCPs 104 provide an acknowledgment to a CCP node 103 once they have received state data. This process 300 enables a CCP node 103 to ensure that state data is received by all LCPs 104 in a distribution list, and to take corrective action in the event that certain LCPs 104 do not provide an acknowledgment.

At 310, CCP node 103a transmits state data and a distribution list to LCP 104a. LCP 104a may, for example, be one LCP 104 among a set of LCPs 104 to which CCP node 103a transmits the state data and the distribution list. The distribution list may identify the LCPs 104 to which the state data relates, and may also identify the distribution pattern.

At 320, LCP 104a transmits an acknowledgment back to CCP node 103a. The acknowledgment may, for example, indicate that LCP 104a has received the state data. LCP 104a then identifies, based on the distribution list and the distribution pattern, a set of LCPs 104 to which to transmit the state data. This set may include LCP 104g, as shown.

At 330, LCP 104a transmits the state data to LCP 104g, which may be one LCP 104 of a set of LCPs 104 to which LCP 104a transmits the state data. The distribution list may also be included with the state data.

At 340, LCP 104g transmits an acknowledgment back to CCP node 103a, which is the CCP node 103 from which the state data originated. If the distribution pattern is not yet complete, LCP 104g uses the distribution list and the distribution pattern to identify a set of LCPs 104 to which to transmit the state data and, possibly, the distribution list.

CCP node 103a receives the acknowledgments, and uses them to determine whether all LCPs 104 on the distribution list have received the state data.

Figure 4:
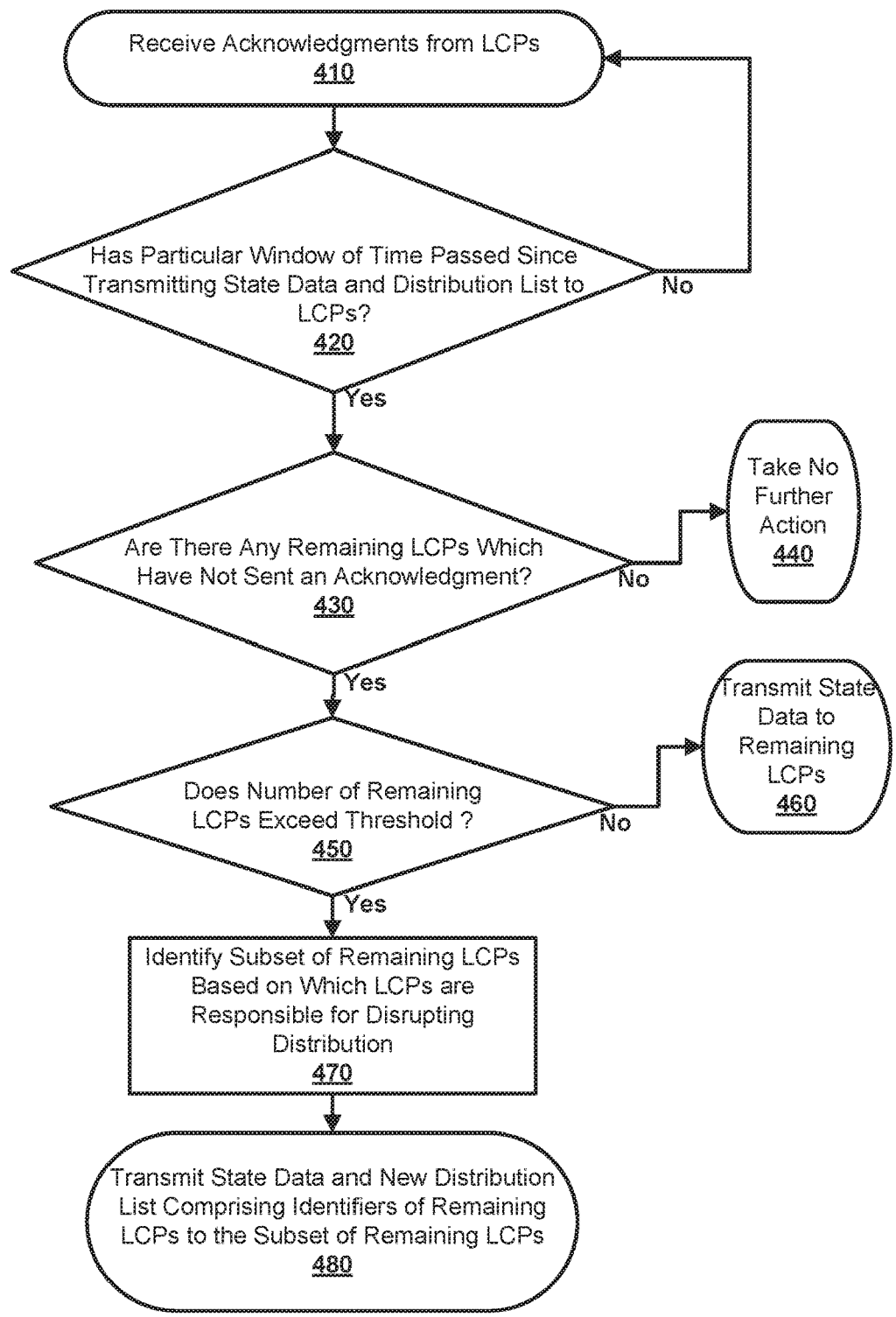
FIG. 4 is a flow chart illustrating a process by which a CCP node ensures that state data is received by all relevant LCPs according to certain embodiments.

FIG. 4 is a flow chart 400 illustrating a process by which a CCP node 103 ensures that state data is received by all relevant LCPs 104 according to certain embodiments. The process may be implemented by a CCP node 103.

At 410, CCP node 103 receives acknowledgments from LCPs 104. The acknowledgments may be sent by LCPs 104 upon receiving the state data, as illustrated in FIG. 3, and may indicate that an LCP 104 has received the state data. CCP node 103 may collect all of these acknowledgments so that they can be compared with the distribution list in order to determine whether all relevant LCPs 104 have received the state data.

At 420, CCP node 103 determines whether a particular window of time has passed since CCP node 103 transmitted the state data and the distribution list to a first set of LCPs 104. CCP node 103 may, for example, have initiated a timer when it initially transmitted the state data and the distribution list to the first set of LCPs. CCP node 103 may also store the particular window of time which indicates how long CCP node 103 should wait for acknowledgments from LCPs 104. The particular window of time may, for example, represent the maximum amount of time within which all LCPs 104 are expected to receive the state data and transmit an acknowledgment. If the particular window of time has not yet passed, CCP node 103 returns to 410 where it continues to receive acknowledgments from LCPs 104.

At 430, the particular window of time has passed, and CCP node 103 determines whether there are any remaining LCPs 104 which have not sent an acknowledgment. This determination may be made by comparing the LCPs 104 which have sent an acknowledgment to the LCPs 104 included in the distribution list. If an LCP 104 has not sent an acknowledgment, this indicates that the LCP 104 has not yet received the state data for some reason, such as a failure at some point in the distribution pattern. If there are no remaining LCPs 104 which have not yet sent an acknowledgment, then CCP node 103 assumes that all LCPs 104 on the distribution list have received the state data, and takes no further action at 440.

At 450, CCP node 103 has determined that there are remaining LCPs 104 which have not sent an acknowledgment, and CCP node 103 may determine how (e.g., the best way) to transmit the state data to these remaining LCPs 104. CCP node 103 may first determine whether the number of remaining LCPs 104 exceeds a threshold. The threshold may represent, for example, the maximum number of LCPs 104 to which CCP node 103 could directly transmit the state data without a substantial burden on communication resources, and may be determined in advance by the CCP node 103. If the number of remaining LCPs 104 does not exceed the threshold then, at 460, CCP node 103 may transmit the state data directly to the remaining LCPs 104.

At 470, CCP node 103 has determined that the number of remaining LCPs 104 exceeds the threshold, and now begins a new distribution pattern. CCP node 103 may identify a subset of the remaining LCPs 104 to which it will transmit the state data and a distribution list comprising identifiers of the remaining LCPs 104. This determination may be based on the distribution pattern, and also may be based on a determination of which LCPs 104 are responsible for disrupting the distribution. For example, if CCP Node 103 observes that the distribution stopped at a certain LCP 104 (e.g., in the binary tree), then this certain LCP 104 may be selected as the subset. Assuming that the certain LCP 104 has not failed entirely, it may be able to provide the state data to the rest of the remaining LCPs 104 according to the distribution pattern. If the certain LCP 104 has failed entirely, then a network administrator may be notified so that additional corrective action can be taken.

At 480, CCP node 103 transmits the state data and the new distribution list to the subset of the remaining LCPs 104. The LCPs 104 in the subset may receive the state data and the new distribution list, and then continue the distribution pattern as necessary. Once again, each LCP 104 may transmit an acknowledgment back to CCP node 103 upon receiving the state data. This process may be repeated until all LCPs 104 on the new distribution list have received the state data and provided an acknowledgment to CCP node 103.

Figure 5:
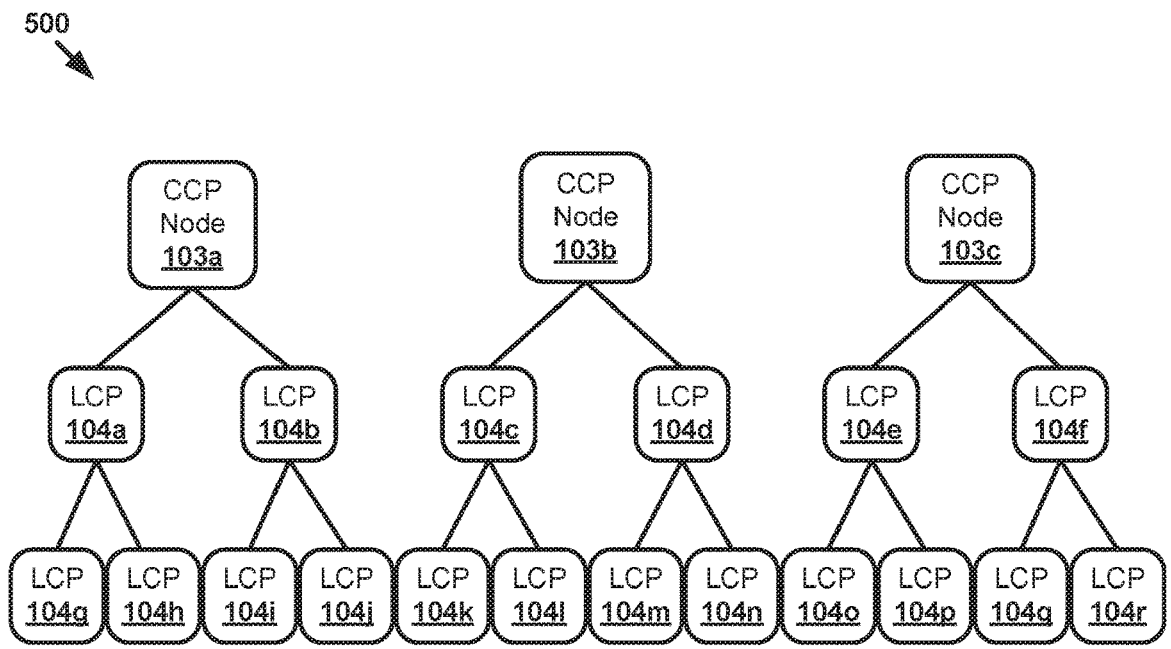
FIG. 5 illustrates an exemplary distribution pattern by which state data is distributed to a plurality of LCPs according to certain embodiments.

FIG. 5 illustrates an exemplary distribution pattern 500 by which state data is distributed to a plurality of LCPs 104 according to certain embodiments. This distribution pattern 500 may be completely described in a distribution list, completely included in information stored by all LCPs 104 and CCP nodes 103, or may be based on a combination of the two.

The distribution pattern 500, as shown, comprises a binary tree pattern, but other types of distribution patterns may be employed without departing from the scope of the present application. Taking a portion of the illustration as an example, CCP node 103a, based on distribution pattern 500, selects LCPs 104a and 104b as a subset of LCPs 104 to which to transmit state data and the distribution list. LCP 104a, upon receiving this information, selects LCPs 104g and 104h to which to transmit the state data. Because LCPs 104g and 104h do not have any LCPs 104 beneath them in the binary tree, they may not need to transmit the state data any further.

In other embodiments, a non-binary tree distribution pattern may be employed. For example, a particular distribution pattern may direct that certain CCP nodes 103 and LCPs 104 in the tree distribute data to greater than or fewer than two LCPs 104 (e.g. some nodes in the tree may have a different number of "leaves" than others).

The distribution pattern 500 may be generated based on a number of factors. For example, a binary tree may be constructed based on distance, such that a sender may provide the state data (and the distribution list) to the two nearest LCPs 104 (or in a non-binary tree, to a different number of nearest LCPs 104). Distance may, for example, be determined by measuring the delay between every pair of LCPs 104, as well as the delay between every CCP node 103 and every LCP 104, and aggregating all of these delays by the CCP nodes 103. CCP nodes 103 may then construct the tree, beginning with each of the three CCP nodes 103 as the roots, by greedily selecting for every sender in the tree the (e.g., two) nearest unselected LCPs 104 to which it may transmit. Therefore, if LCP 104*a* and LCP 104*b* are the nearest LCPs 104 to CCP node 103*a*, then they will be directly beneath CCP node 103*a* in the tree, as shown in distribution pattern 500. Once the tree has been constructed, it may be described in each distribution list which is transmitted with state data, or it may be provided to all LCPs 104 in advance by CCP nodes 103. Alternatively, based on the distribution list and information stored by the LCPs 104 indicating that a (e.g., binary) tree pattern is to be used, each LCP 104 may calculate the (e.g., two) nearest LCPs 104 dynamically and independently upon receiving the state data and the distribution list. In some embodiments, the distribution list may comprise a "flattened out" version of the tree of distribution pattern 500, such that the ordering of the LCP 104 identifiers in the distribution list is based on the location of each LCP 104 in the tree.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present application. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method for interconnecting a plurality of local control planes (LCPs) for state data exchange, comprising:
   receiving, by a first LCP of the plurality of LCPs, from a central control plane (CCP) node, state data and a distribution list, wherein the distribution list comprises identifiers of a set of LCPs of the plurality of LCPs to which the state data relates;
   transmitting, by the first LCP, an acknowledgment to the CCP node indicating that the first LCP has received the state data;
   identifying, by the first LCP, and according to a distribution pattern, one or more target LCPs of the set of LCPs identified in the distribution list, wherein the distribution pattern is based on at least one of:
   information included in the distribution list; and
   information stored by the first LCP;
   transmitting, by the first LCP, the state data to the one or more target LCPs;
   receiving, by each respective LCP of the one or more target LCPs, the state data from the first LCP;
   transmitting, by each respective LCP of the one or more target LCPs, a respective acknowledgment to the CCP node indicating that the respective LCP has received the state data;
   receiving, by the CCP node, the acknowledgment from the first LCP and the respective acknowledgment from each respective LCP of the one or more target LCPs; and
   identifying, by the CCP node, and based on the distribution list, any remaining LCPs of the set of LCPs identified in the distribution list that have not transmitted acknowledgements to the CCP node.

2. The method of claim 1, wherein the distribution pattern comprises a binary tree pattern.

3. The method of claim 1, further comprising:
   determining, by the CCP node, whether a number of the remaining LCPs exceeds a threshold; and
   upon determining, by the CCP node, that the number of the remaining LCPs does not exceed the threshold:
   transmitting, by the CCP node, the state data to the remaining LCPs.

4. The method of claim 3, wherein the remaining LCPs are identified after a particular window of time has passed since the state data and the distribution list were transmitted by the CCP node to the first LCP.

5. The method of claim 4, further comprising:
   upon determining, by the CCP node, that the number of the remaining LCPs exceeds the threshold:
   identifying, by the CCP node, a subset of LCPs which comprises a subset of the remaining LCPs; and
   transmitting, by the CCP node, the state data and a new distribution list to the subset of LCPs, wherein the new distribution list comprises the identifiers of the remaining LCPs.

6. The method of claim 5, wherein the subset of LCPs is identified based on a determination, by the CCP node, that particular LCPs of the remaining LCPs were responsible for disrupting the distribution pattern, wherein the determination is based on the acknowledgment from the first LCP, the acknowledgment from each LCP of the one or more target LCPs, and the distribution pattern.

7. A non-transitory computer readable medium comprising instructions to be executed in a computer system, wherein the instructions when executed in the computer system, cause the computer system to perform a method for interconnecting a plurality of local control planes (LCP) for state data exchange, the method comprising:
   receiving, by a first LCP of the plurality of LCPs, from a central control plane (CCP) node, state data and a distribution list, wherein the distribution list comprises identifiers of a set of LCPs of the plurality of LCPs to which the state data relates;
   transmitting, by the first LCP, an acknowledgment to the CCP node indicating that the first LCP has received the state data;
   identifying, by the first LCP, and according to a distribution pattern, one or more target LCPs of the set of LCPs identified in the distribution list, wherein the distribution pattern is based on at least one of:
   information included in the distribution list; and
   information stored by the first LCP;
   transmitting, by the first LCP, the state data to the one or more target LCPs;
   receiving, by each respective LCP of the one or more target LCPs, the state data from the first LCP;
   transmitting, by each respective LCP of the one or more target LCPs, a respective acknowledgment to the CCP node indicating that the respective LCP has received the state data;
   receiving, by the CCP node, the acknowledgment from the first LCP and the respective acknowledgment from each respective LCP of the one or more target LCPs; and
   identifying, by the CCP node, and based on the distribution list, any remaining LCPs of the set of LCPs identified in the distribution list that have not transmitted acknowledgements to the CCP node.

8. The non-transitory computer readable medium of claim 7, wherein the method further comprises:
   determining, by the CCP node, whether a number of the remaining LCPs exceeds a threshold; and
   upon determining, by the CCP node, that the number of the remaining LCPs does not exceed the threshold:
   transmitting, by the CCP node, the state data to the remaining LCPs.

9. The non-transitory computer readable medium of claim 8, wherein the remaining LCPs are identified after a particular window of time has passed since the state data and the distribution list were transmitted by the CCP node to the first LCP.

10. The non-transitory computer readable medium of claim 9, wherein the method further comprises:
    upon determining, by the CCP node, that the number of the remaining LCPs exceeds the threshold:
    identifying, by the CCP node, a subset of LCPs which comprises a subset of the remaining LCPs; and
    transmitting, by the CCP node, the state data and a new distribution list to the subset of LCPs, wherein the new distribution list comprises the identifiers of the remaining LCPs.

11. The non-transitory computer readable medium of claim 10, wherein the subset of LCPs is identified based on a determination, by the CCP node, that particular LCPs of the remaining LCPs were responsible for disrupting the distribution pattern, wherein the determination is based on the acknowledgment from the first LCP, the acknowledgment from each LCP of the one or more target LCPs, and the distribution pattern.

12. The non-transitory computer readable medium of claim 7, wherein the distribution pattern comprises a binary tree pattern.

13. A computer system, comprising: one or more processors; and a non-transitory computer-readable medium comprising instructions that, when executed by the one or more processors, cause the one or more processors to perform a method for interconnecting a plurality of local control planes (LCP) for state data exchange, the method comprising:
- receiving, by a first LCP of the plurality of LCPs, from a central control plane (CCP) node, state data and a distribution list, wherein the distribution list comprises identifiers of a set of LCPs of the plurality of LCPs to which the state data relates;
- transmitting, by the first LCP, an acknowledgment to the CCP node indicating that the first LCP has received the state data;
- identifying, by the first LCP, and according to a distribution pattern, one or more target LCPs of the set of LCPs identified in the distribution list, wherein the distribution pattern is based on at least one of:
  - information included in the distribution list; and
  - information stored by the first LCP;
- transmitting, by the first LCP, the state data to the one or more target LCPs;
- receiving, by each respective LCP of the one or more target LCPs, the state data from the first LCP;
- transmitting, by each respective LCP of the one or more target LCPs, a respective acknowledgment to the CCP node indicating that the respective LCP has received the state data;
- receiving, by the CCP node, the acknowledgment from the first LCP and the respective acknowledgment from each respective LCP of the one or more target LCPs; and
- identifying, by the CCP node, and based on the distribution list, any remaining LCPs of the set of LCPs identified in the distribution list that have not transmitted acknowledgements to the CCP node.

14. The computer system of claim 13, wherein the method further comprises:
- determining, by the CCP node, whether a number of the remaining LCPs exceeds a threshold; and
- upon determining, by the CCP node, that the number of the remaining LCPs does not exceed the threshold:
- transmitting, by the CCP node, the state data to the remaining LCPs.

15. The computer system of claim 14, wherein the remaining LCPs are identified after a particular window of time has passed since the state data and the distribution list were transmitted by the CCP node to the first LCP.

16. The computer system of claim 15, wherein the method further comprises:
- upon determining, by the CCP node, that the number of the remaining LCPs exceeds the threshold:
- identifying, by the CCP node, a subset of LCPs which comprises a subset of the remaining LCPs; and
- transmitting, by the CCP node, the state data and a new distribution list to the subset of LCPs, wherein the new distribution list comprises the identifiers of the remaining LCPs.

17. The computer system of claim 16, wherein the subset of LCPs is identified based on a determination, by the CCP node, that particular LCPs of the remaining LCPs were responsible for disrupting the distribution pattern, wherein the determination is based on the acknowledgment from the first LCP, the acknowledgment from each LCP of the one or more target LCPs, and the distribution pattern.

18. The computer system of claim 13, wherein the distribution pattern comprises a binary tree pattern.

* * * * *